United States Patent [19]

Smith

[11] Patent Number: 4,921,188
[45] Date of Patent: May 1, 1990

[54] SPINNING-TYPE FISHING REELS WITH IMPROVED LINE HANDLING

[76] Inventor: Benny E. Smith, 14 Mako Box 115, Sebring, Fla. 33870

[21] Appl. No.: 326,102

[22] Filed: Mar. 20, 1989

Related U.S. Application Data

[63] Continuation-in-part of Ser. No. 279,339, Nov. 30, 1988, abandoned, which is a continuation of Ser. No. 224,176, Apr. 27, 1988, abandoned, which is a continuation of Ser. No. 103,546, Oct. 1, 1987, abandoned, which is a continuation of Ser. No. 904,291, Sep. 8, 1986, abandoned, which is a continuation-in-part of Ser. No. 730,491, May 6, 1985, abandoned.

[51] Int. Cl.$^5$ .............................................. A01K 89/01
[52] U.S. Cl. .................................................. 242/233
[58] Field of Search ................ 242/230, 231, 232, 233

[56] References Cited

U.S. PATENT DOCUMENTS

| | | | |
|---|---|---|---|
| 2,586,921 | 2/1952 | Delphon | 242/228 |
| 2,966,314 | 12/1960 | Mombur | 242/233 |
| 3,036,788 | 5/1962 | Gentusa | 242/230 |
| 3,095,158 | 6/1963 | Louison | 242/233 |
| 3,233,845 | 2/1966 | Inamura | 242/233 |
| 4,350,312 | 9/1982 | Masclet | 242/233 |
| 4,389,027 | 6/1983 | Sazaki et al. | 242/233 |
| 4,535,952 | 8/1985 | Carlsson | 242/233 |
| 4,676,450 | 6/1987 | Carpenter | 242/233 |

OTHER PUBLICATIONS

Zebco Quantum Snapshot Owner's Manual, 1989.

*Primary Examiner*—Katherine A. Matecki
*Attorney, Agent, or Firm*—Carroll F. Palmer

[57] ABSTRACT

Spinning-type fishing reels that do not require contact of a user's finger with the fishing line during manipulation of the reel's bail from a closed, line holding to an opened, line casting position comprise a line retention device linked into a trigger assembly. Such line retention device includes a pin that is moved via linked reel elements to a trigger and functions (a) to automatically engage the fishing line as the reel's bail is moved by the trigger assembly that includes the trigger toward an opened (line casting) position, (b) to retain the fishing line against unreeling while the trigger is held in the bail opened position, and (c) to automatically release the line to permit it to unreel from the reel's spool upon release of the trigger as the cast of the fishing line is preformed.

18 Claims, 9 Drawing Sheets

SPINNING-TYPE FISHING REELS WITH IMPROVED LINE HANDLING

CROSS-REFERENCE TO RELATED APPLICATIONS

This application is a continuation-in-part of copending patent application Ser. No. 279,339, filed Nov. 30, 1988, which, in turn, is a continuation of application Ser. No. 224,176, filed April 27, 1988 as a continuation of Ser. No. 103,546, filed Oct. 1, 1987 as a continuation of Ser. No. 904,291, filed Sept. 8, 1986 as a continuation-in-part of Ser. No. 730,491, filed May 6, 1985, all now abandoned.

BACKGROUND OF THE INVENTION

1. Field of the Invention

This invention relates broadly to open face, spinning-type fishing reels. More particularly, it concerns such reels in which the reel's fishing line is automatically handled so users need not contact the line with a finger during casting with the reels.

2. Description of the Prior Art

In the world of sport-fishing, there are two basically different types of reels commonly in use. First, there are the straight-casting type in which the winding spool rotates on a axis fixed at right angles to the fishing rod. In such reels, the spool rotates in one direction on the cast of the fishing line and in the opposite direction on line retrieval. Because of spool inertia, so-called "backlashes" frequently occur in the use of such reels.

The second type reels, the so-called spin-cast or spinning type reels (see U.S. Pat. No. 3,743,207) enjoy great popularity because they have little tendency to backlash. In such reels, the spool axis is aligned with the fishing rod and it does not usually rotate. Instead, the line is wound on the spool during the retrieval mode by a rotatable bail. This present invention concerns this open-face spinning-type fishing reels.

In order to assist fisherman in the use of spinning-type reels, various types of trigger mechanisms have been disclosed and incorporated in such fishing reels. One such type trigger mechanism serves to return the bail to a closed (line engaging) position upon completion of a cast (see U.S. No. 3,796,391). This type bail return is also now more frequently accomplished by suitable structuring the reel crank mechanism to automatically return the bail to the closed position simultaneously with the movement of the reel's crank to retrieve the line.

In many spinning-type reels, the bail is moved by hand from its closed position to the opened position in preparation for a cast. Trigger mechanisms have been developed to assist in performing this necessary bail movement (see U.S. No. 3,342,442; 4,427,161, & 4,676,450). However, reels of this latter type still present a use problem since the fishing line must be grasped by a finger of the user in order to prevent it from unwinding off the spool as the trigger mechanism moves the bail into the open position in preparation for a cast.

There is a need for improvement in spinning-type reels to eliminate the use of fingers to retain line as a part of fishing operations using such reels. This invention provides such improvement.

OBJECTS

A principal object of the invention is the provision of unique automation improvements in open-face spinning-type fishing reels.

Further objects include the provision of improved open-face spinning-type fishing reels that:

1. Enable the user to move the reel's bail from the closed to the opened position in preparation to cast without need to grasp or otherwise contact the fishing line with a finger.

2. Permit the user to move the bail via a trigger operated by the same hand that holds the fishing rod and, at the same time, automatically controls the line to prevent its unwinding from the reel until the trigger is released during the casting operation.

3. Make the operation of spinning-type fishing reels more automated.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

The objects are accomplished, in part, in accordance with the invention by the inclusion of a new type of trigger operated line control device in spinning-type fishing reels.

In a principal embodiment of the invention, the improvements thereof are applied to known open-face spinning-type fishing reels that have a reciprocating spool; a rotatable bail unit including a bail that swings about a pivot carried in the reel, a trigger assembly for swinging the bail from a closed, line winding position to a opened, line casting position, for temporarily holding the bail in the line casting position and for releasing the bail to return to its line winding position at the completion of a cast of the fishing line and crank means that reciprocates the spool along the longitudinal axis of the reel, rotates the bail unit around said longitudinal axis for winding fishing line around the spool and returns the bail after release by the trigger assembly to its line winding position at the completion of a cast.

The invention improvement comprises line holding means mounted on the bail unit of the reel for rotation therewith. Such means functions (a) to engage the fishing line as the bail is moved by the trigger assembly toward the line casting position, (b) to retain the fishing line against unreeling while the trigger assembly holds the bail in the line casting position, and (c) to release the line to permit its unreeling from the spool upon the release of the trigger assembly in the process of casting of the fishing line.

The improvement also comprises means linking the line holding means to the trigger assembly to cause the means to perform the stated functions a–c.

Additionally, the bail may include a line guide portion that moves in an arc that intersects a guideway entrance. Further, the trigger assembly may include a pivoted trigger having a lateral cam portion that engages a crank arm to cause it to move upon movement of the trigger.

In a first embodiment of the invention, the line holding means comprises a guideway having an entrance into which the fishing line is moved by the bail as the bail is moved by the trigger assembly toward the line casting position and there is a pin that reciprocates across the guideway entrance to block and unblock the entrance. Advantageously, the pin is spring biased to move to unblock the guideway entrance and the trigger assembly comprises a pivoted crank arm that engages the pin to move it across the guideway entrance. Also, such crank arm serves to move the bail from the line winding position to the line casting position.

In second, third and fourth embodiments of the invention, there is no guideway and the line holding means comprises a line engaging pin moved on a crank arm which, in turn, is moved by the trigger assembly so that such pin picks up the line as the trigger assembly swings the bail from its closed position to its opened position.

The invention, in addition to providing improvements to prior known spinning-type fishing reels, may be utilized to create such forms of reels comprising the invention's own structured crank, trigger and related mechanisms. Also, the new improvements are applicable to all known spinning-type fishing reels including those equipped with crank operated bail return features, variable spool reciprocation, interchangeable spools, and similar mechanical and functional features.

BRIEF DESCRIPTION OF THE DRAWINGS

A more complete understanding of the invention may be had by reference to the accompanying drawings in which:

In FIGS. 34-39 a coverplate on a base portion of the trigger assembly has been removed for the sake of showing arrangement of internal parts.

DESCRIPTION OF THE PREFERRED EMBODIMENTS

Referring in detail to the drawings, in which identical parts are identically marked, the invention in broad terms concerns an automatic line control device 2 as an improvement to a spinning-type fishing reel 4 that includes a trigger assembly 6. Basically, the control device 2 comprises line holding means 8 and means 10 linking the line holding means 8 to the trigger assembly 6.

Spinning-type fishing reels 4 improved by the invention comprise a reciprocating spool 12 and a rotatable bail unit 14 including a bail 16 that swings about a pivot 18.

The trigger assembly 6 is used for swinging the bail 16 from a line winding (closed) position (see FIG. 4) to a line casting (opened) position (see FIG. 5), for temporarily holding the bail 16 in the line casting position and for releasing the bail so it may be returned to its line winding position at the completion of a cast of the fishing line either by finger pressure on the bail 16 or by turning the crank means 20.

The reel 4 also comprises crank means 20 that reciprocates the spool 12 along the longitudinal axis of the reel 4 and the fishing rod 22, rotates the bail unit 14 around such longitudinal axis for winding fishing line 24 around the spool 12 and returns the bail 16 to its line winding position at the completion of a cast.

The line holding means 8 comprises a guideway 30 having an entrance 32 into which the fishing line 24 is moved by the bail 16 as tee bail is moved by the trigger assembly 6 toward the line casting position.

Means 8 also comprises a pin 34 that reciprocates across the quideway entrance 32 to block and unblock the entrance 32. The pin 34 is biased by spring 36 to move to unblock the guideway entrance and the trigger assembly 6 comprises a pivoted crank arm 40 with a butt portion 41 that engages the pin 34 to move it against the pressure of spring 36 across the guideway entrance 32. Also, such crank arm 40 engages the bail unit 14 to move the bail 16 from its line winding position to the line casting position.

The bail unit 14 includes a crank 42 and line guide portion 44 that is moved by crank 42 about pivot 18 in an arc that intersects the guideway entrance 32. The bail 16 and the line guide 44 are mounted to the crank 42 via the drilled offset portion 45.

The crank 42 includes a projection (pin) 46 that rides in a recess 48 in the crank arm 40 to cause the crank 42 to move in a clockwise direction upon similar movement of the crank arm 40. Since the recess 48 is open at the right side 40a of arm 40, counter-clockwise moment of crank arm 40 does not produce any movement effect on the crank 42 or the bail 16. This permits the bail to remain in the opened position even as the pin withdraws from the entrance 32, an important effect in operation of the new control device 2 as will become more apparent in the operation description presented below.

The trigger assembly 6 includes a pivoted trigger 50 having a lateral cam portion 52 that engages the butt portion 41 of crank arm 40 to cause crank arm 40 to move upon movement of the trigger 50.

The crank arm 40 is pivoted on the pin 54 that is screwed into the base portion 56 of the trigger assembly 6. Base portion 56 includes a recess 58 in which a coil spring 60 is captured. One end 62 of the spring 60 bears on the recess 58 and the other end 64 hooks to the crank 42.

The spring 60 is an overcenter spring to hold the bail 16 open or closed depending on its orientation with respect to the deadcenter.

Base portion 56 also includes an arcuate recess 66 that functions with the pin 68 on crank 42 to limit the extent of clockwise movement of the crank 42 upon upward movement of trigger 50 and counter-clockwise movement of crank 42 upon release of the trigger 50.

The pivot 18 consists of a pin screwed into the trigger assembly base portion 56.

In the second embodiment shown in FIGS. 15-22, an automatic line control device 102 on the spinning-type fishing reel 104 includes a trigger assembly 106.

Basically, the control device 102 comprises line holding means 108 and means 110 linking the line holding means 108 to the trigger assembly 106.

The spinning-type fishing reel 104 comprises a reciprocating spool 112 and a rotatable bail unit 114 including a bail 116 that swings about a pivot 118.

The trigger assembly 106 is used for swinging the bail 116 from a line winding (closed) position (see FIGS. 17 & 19) to a line casting (opened) position (see FIGS. 18 & 20), for temporarily holding the bail 116 in the line casting position and for releasing the bail so it may return to its line winding position at the completion of a cast of the fishing line.

The reel 104 also comprises crank means 120 that reciprocates the spool 112 along the longitudinal axis of the reel 104, rotates the bail unit 114 around such longitudinal axis for winding fishing line 122 around the spool 112 and returns the bail 116 to its line winding position at the completion of a cast.

Figure 19:
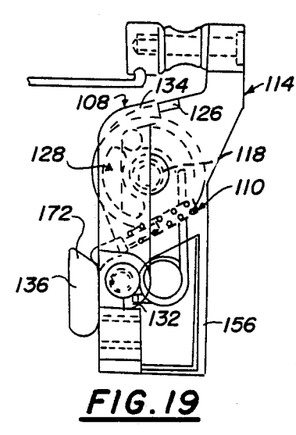
FIG. 19 is another partial, sectional view of the trigger assembly of the reel shown in FIG. 16.
Figure 20:
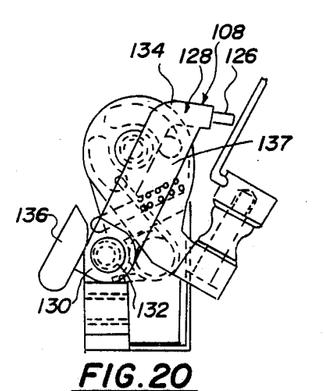
FIG. 20 is a sectional view similar to FIG. 19 showing another position of the line holding means of the invention in use of the reel.

The line holding means 108 comprises a pin 126 and crank arm 128 by which the fishing line 124 is moved by the bail 116 as the bail is moved by the trigger assembly 106 toward the line casting position. The pin 126 and crank arm 128 move between a fishing line holding position as shown in FIG. 20 and a non-holding position as shown in FIG. 19.

The crank arm 128 is pivoted at the end 130 on a pin 132 while the free end 134 carries the pin 126. A butt portion 136 extends laterally from the end 130 of the arm 128 and there is a longitudinal channel 137 cut out of the underside of the arm 128.

Figure 10:
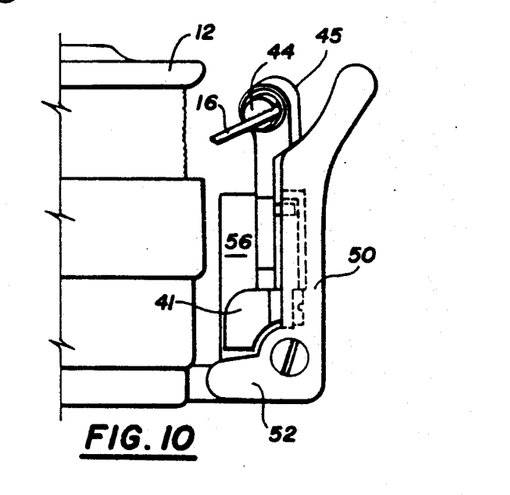
FIG. 10 is a lateral, fragmentary view similar to FIG. 9, but with the trigger in the released mode and the bail in the closed position.
Figure 11:
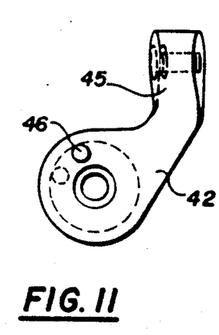
FIG. 11 is a plan view of a crank member used to move the bail in reels of the invention.
Figure 12:
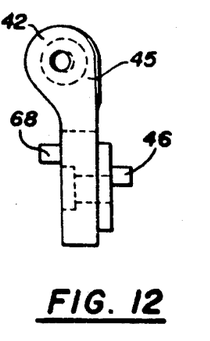
FIG. 12 is a lateral view corresponding to FIG. 11.
Figure 13:
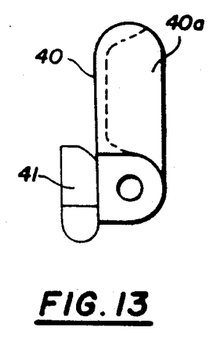
FIG. 13 is a plan view of a crank arm used to move the crank member and link a line holding member to a trigger assembly in reels of the invention.
Figure 14:
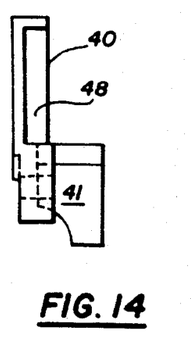
FIG. 14 is a lateral view corresponding to FIG. 13.
Figure 15:
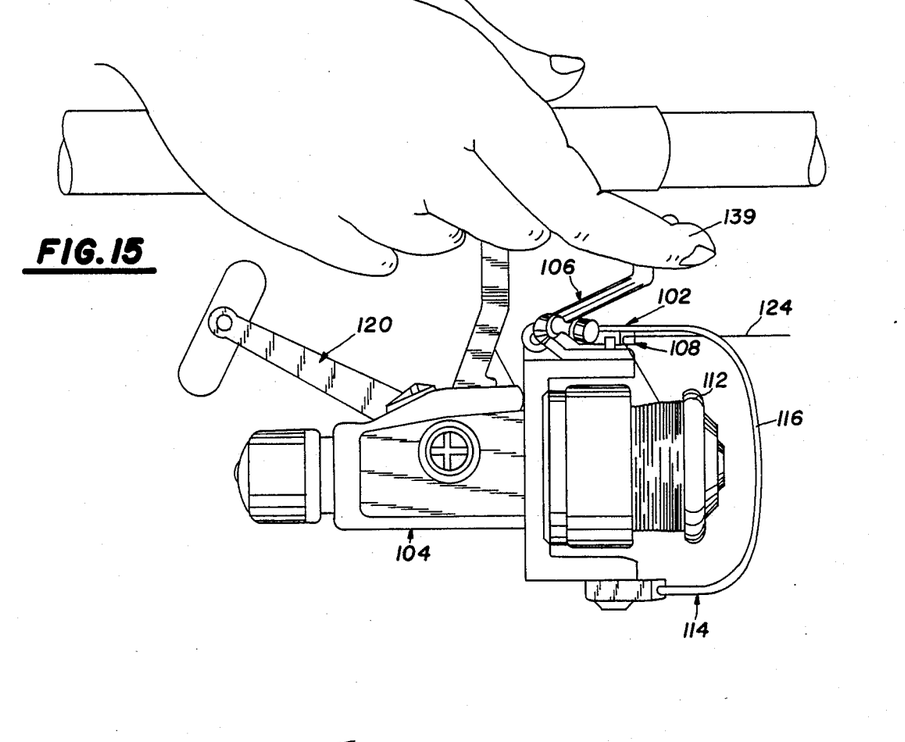
FIG. 15 is a right-side, lateral view of a second embodiment of an open-face spinning-type fishing reel constructed in accordance with the invention.
Figure 16:
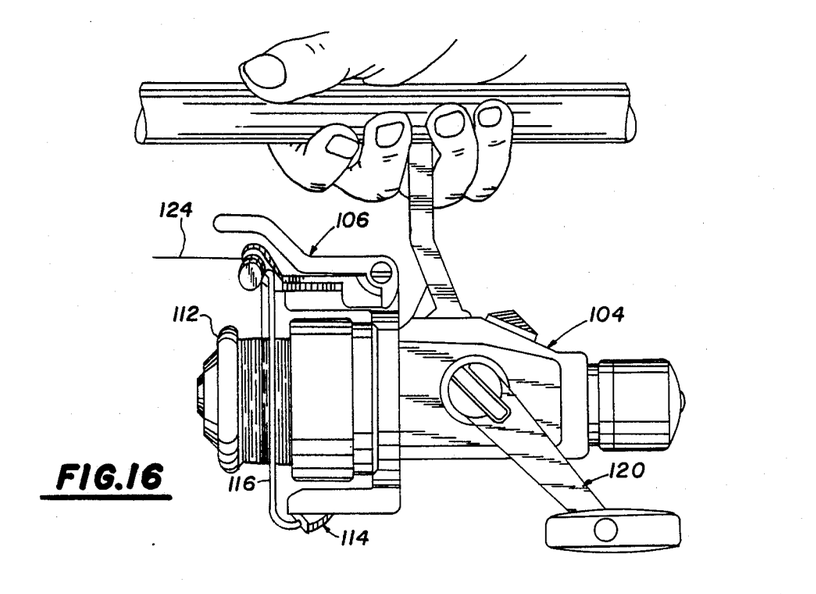
FIG. 16 is a left-side, lateral view of the open-face spinning-type fishing reel shown in FIG. 15.
Figure 21:
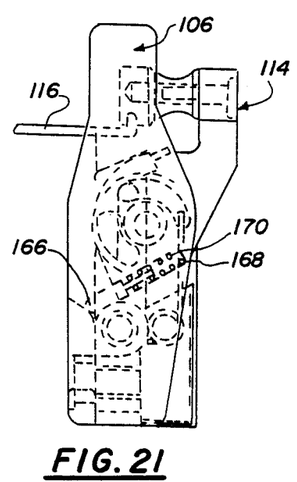
FIG. 21 is a partial, plan view of the trigger portion of the reel also shown in section in FIGS. 17-20.
Figure 22:
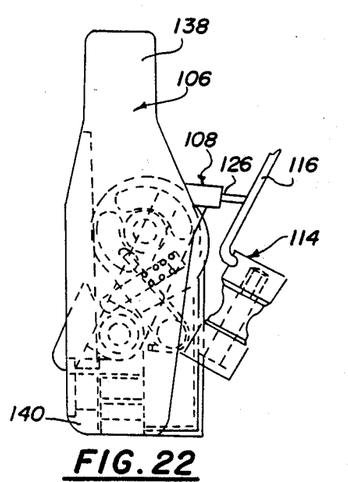
FIG. 22 is a plan view similar to FIG. 21 showing another position of the line holding means of the invention in use of the reel.

The trigger assembly 106 includes a pivoted trigger 138 having a lateral cam portion 140 (similar to the portion 52 in FIG. 10) that engages the butt portion 136 of crank arm 128 to cause crank arm 128 to move clockwise, i.e., from the position shown in FIG. 21 to the position shown in FIG. 22, upon upward movement of the trigger 138 which occurs when a finger 139 of the user of the reel pulls the trigger to swing the bail 116 from the closed position as shown in FIG. 16 into the opened position as shown in FIG. 15.

Figure 17:
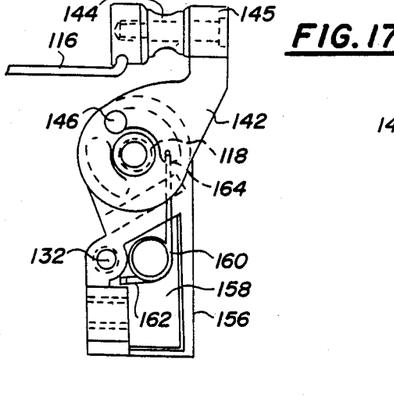
FIG. 17 is a partial, sectional view of the trigger assembly of the reel shown in FIG. 16.
Figure 18:
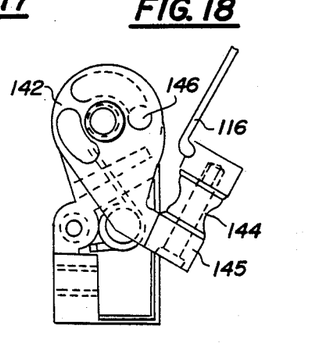
FIG. 18 is a partial, sectional view similar to FIG. 17 showing another position of the line holding means of the invention in use of the reel.

The bail unit 114 includes a crank 142 that moves about pivot 118 in an arc as shown by comparing FIG. 17 with FIG. 18. The bail 116 and the line guide 144 are mounted to the crank 142 via the drilled offset portion 145.

The crank 142 includes a projection (pin) 146 that rides in the channel 137 in the crank arm 128 to cause the crank 142 to move in a clockwise direction upon similar movement of the crank arm 128. Since the channel 137 is open at the right side of crank arm 128, counter-clockwise movement of crank arm 128 does not produce any movement effect on the crank 142 or the bail 116. This permits the bail to remain in the opened position even as the pin moves counter-clockwise from the fishing line holding position shown in FIG. 22 to the line release position shown in FIG. 21, an important effect in operation of the new control device 102 as will become more apparent in the operation description presented below.

As previously stated, the crank arm 128 is pivoted on the pin 132 that is screwed into the base portion 156 of the trigger assembly 106. Base portion 156 includes a recess 158 in Which a coil spring 160 is captured to swing from one stable position (see FIG. 17) through dead center to another stable position (see FIG. 18). One end 162 of the spring 160 bears on the recess 158 and the other end 164 hooks to the crank 142 to bias it toward the line winding (closed) position (FIG. 17) of the bail 116 in one of its stable positions and toward the line-freeing position (opened) (FIG. 18) in the other of its stable positions.

Figure 2:
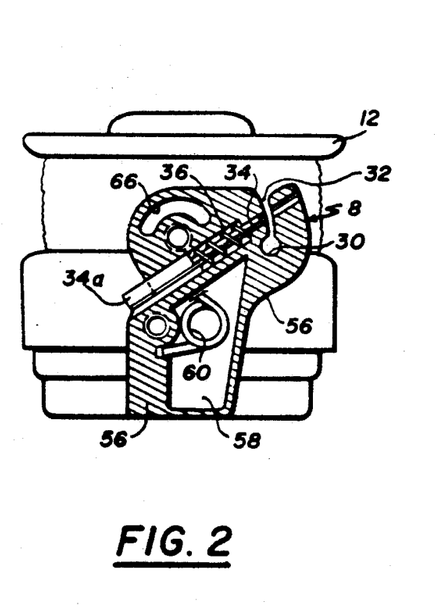
FIG. 2 is a partial, sectional view taken on the line II—II of FIG. 1.
Figure 3:
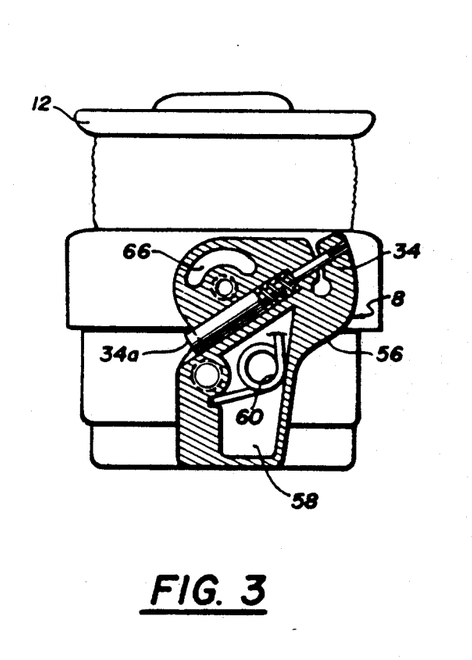
FIG. 3 is a sectional view similar to FIG. 2 showing another position of the line holding means of the invention in use of the reel.

Base portion 156 also includes an arcuate recess (not shown, but similar to recess 66 in FIG. 2) that functions with a pin on crank 142 to limit the extent of clockwise movement of the crank 142 upon upward (cocking) movement of trigger 138 and counter-clockwise movement of crank 142 upon release of the trigger 138.

The pivot 118 consists of a pin screwed into the trigger assembly base portion 156.

The linkage means 110 includes a plunger 166 that compresses a spring 168 into an open-ended bore 170 in the base 156. The plunger 166 bears against the end 172 of butt 136 thereby biasing the arm 128 in the counter-clockwise direction.

Referring to FIGS. 23-27, a third embodiment of the new reels is illustrated which is, in effect, a simplified version of the second embodiment. Thus, the parts of the third embodiment are primarily like those of the second except for the manner in which the line engaging pin carrying crank arm is biased for return to the line releasing position.

Figures 23, 24, 25, 26, 27:
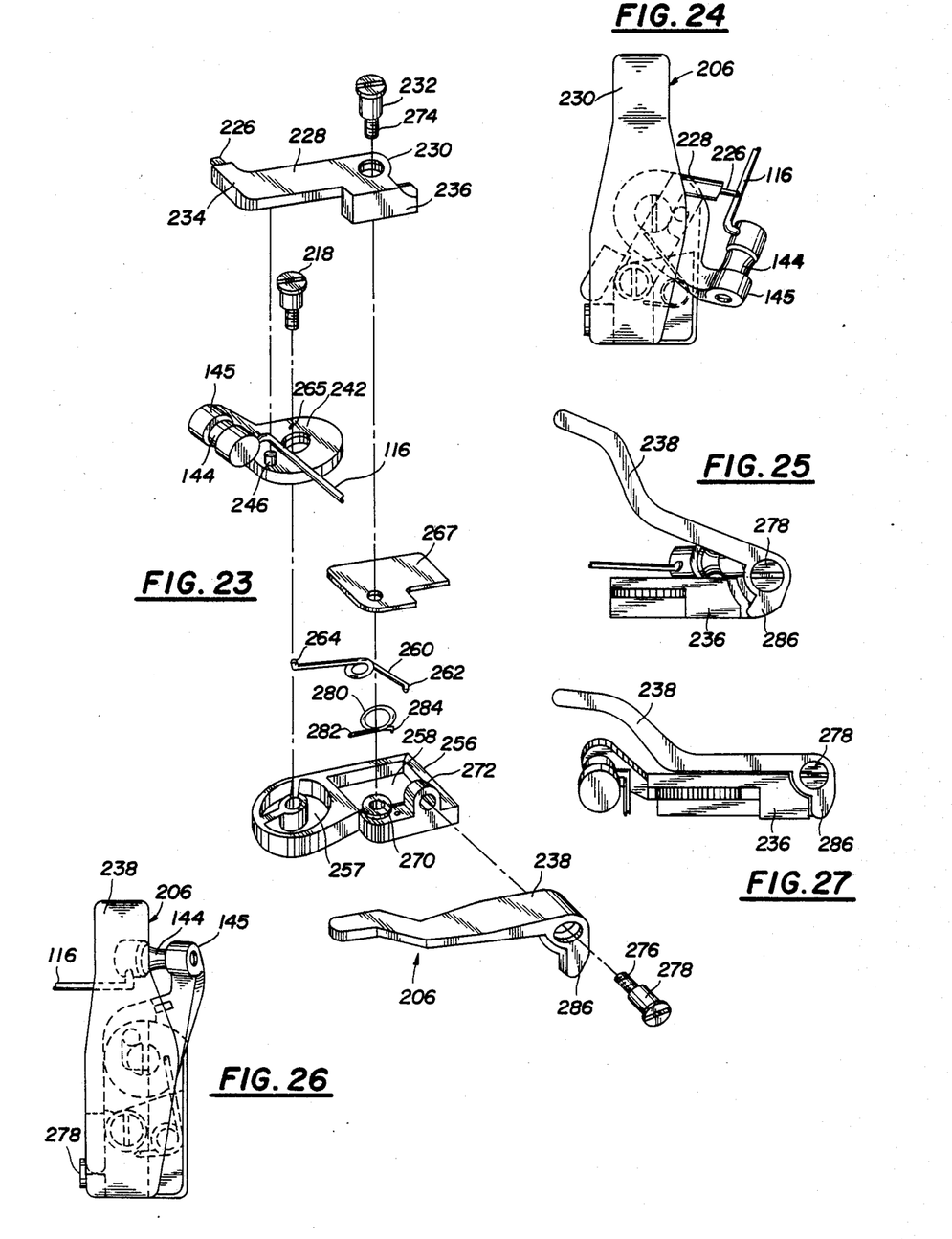
FIG. 23 is an exploded perspective view of a third embodiment of an open-face spinning-type reel of the invention.
FIG. 24 is a partial, plan view of the trigger portion of the reel shown in FIG. 23 with the trigger in the cocked position.
FIG. 25 is lateral view of the trigger portion as shown in FIG. 24.
FIG. 26 is a partial, plan view of the trigger portion of the reel shown in FIG. 23 with the trigger in the released position.
FIG. 27 is lateral view of the trigger portion as shown in FIG. 26.
Figure 28:
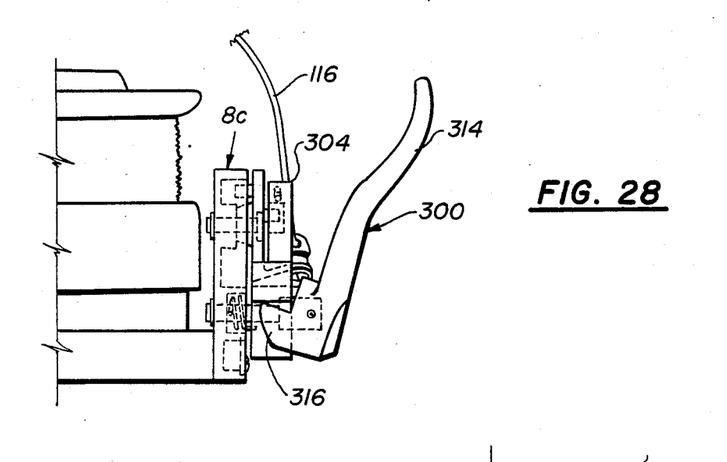
FIG. 28 is a lateral, fragmentary view of a fourth embodiment of a line control mechanism of the invention shown with the trigger cocked and the bail in the opened position.
Figures 29, 30, 31:
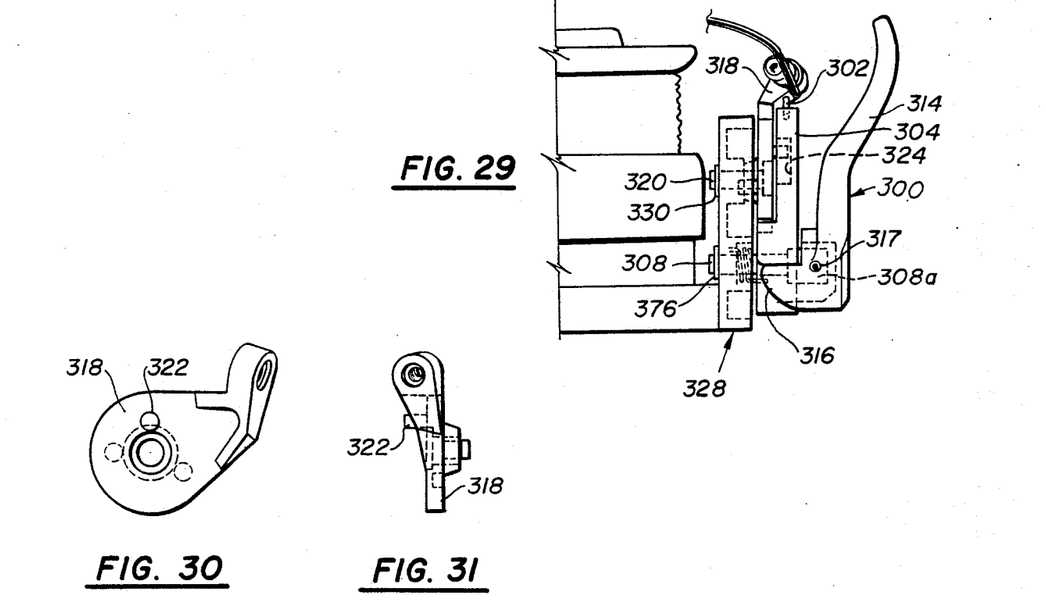
FIG. 29 is a lateral, fragmentary view similar to FIG. 28, but with the trigger in the released mode and the bail in the closed position.
FIG. 30 is a plan view of a crank member used to move the bail in the fourth embodiment shown in FIG. 28.
FIG. 31 is a lateral view corresponding to FIG. 30.
Figures 32, 33:
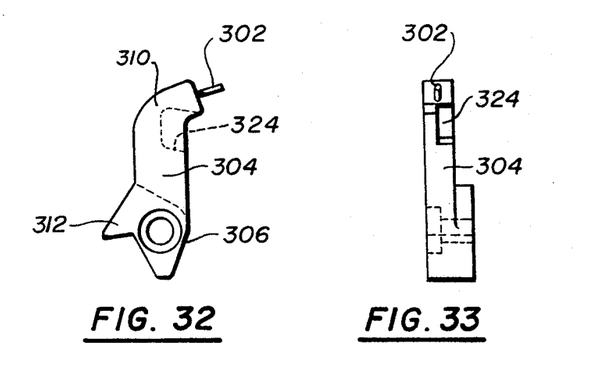
FIG. 32 is a plan view of the bail trip lever in the embodiment of the reel shown in FIG. 28.
FIG. 33 is a lateral view corresponding to FIG. 32.

The trigger assembly 206 comprises a pin 226 and crank arm 228 which move between a fishing line holding position as shown in FIG. 24 and a non-holding position as shown in FIG. 26.

The crank arm 228 is pivoted at the end 230 on a pin 232 while the free end 234 carries the pin 226. A butt portion 236 extends laterally from the end 230 of the arm 228 and there is a longitudinal channel (not shown) cut out of the underside of the arm 228.

The trigger assembly 206 includes a pivoted trigger 238 having a lateral cam portion 240 that engages the butt portion 236 of crank arm 228 to cause arm 228 to move clockwise, i.e., from the position shown in FIG. 26 to the position shown in FIG. 24, upon upward movement of the trigger 238.

A crank 242 moves on pivot pin 218 in an arc as shown by comparing FIG. 24 with FIG. 26. The bail 116 and the line guide 144 are mounted to the crank 242 via the drilled offset portion 145.

The crank 242 includes a projection (pin) 246 that rides in the aforesaid channel in the crank arm 228 to cause the crank 242 to move in a clockwise direction upon similar movement of the arm 228.

As previously stated, the arm 228 is pivoted on the pin 232 that is screwed into the base portion 2S6 of the trigger assembly 206. Base portion 256 includes a recess 258 in which a toggle spring 260 is captured to swing from one stable position (see FIG. 24) through dead center to another stable position (see FIG. 26). One end 262 of the spring 260 bears on the recess 258 and the other end 264 hooks into hole 265 of crank 242 to bias it toward the line winding (closed) position (FIG. 26) of the bail 116 in one of its stable positions and toward the line-freeing position (opened) (FIG. 24) in the other of its stable positions.

A plate 267 is provided to cover the recess 258 and retain the spring 260 therein.

Base portion 256 also includes an arcuate recess 257 that functions with a pin (not shown) on crank 242 to limit the extent of clockwise movement of the crank 242 upon upward (cocking) movement of trigger 238 and counter-clockwise movement of crank 242 upon release of the trigger 238. Base portion 256 also includes a circular lug 270 and an arcuate lug 272. Lug 270 is tapped to receive the threaded end 274 of pin 232 and lug 272 is tapped to receive the threaded end 276 of pin 278.

The coil spring 280 is the means in trigger mechanism 206 to bias arm 228 counter-clockwise (ccw) toward the line release position of pin 226. The spring 280 fits over lug 270 and its end 282 engages butt 236 of arm 228 while the other end 284 bears against lug 272 so that spring 280 is compressed when the arm 228 is moved clockwise (cw) by action of cam portion 240 on the butt 236 of arm 228 as trigger 238 is cocked.

Referring to FIGS. 28-40, a fourth embodiment of the new reels is illustrated which is, in effect, a variation of the second and third embodiments and is designed for use with the triggered bail mechanism disclosed in U.S. No. 4,676,450.

Figure 34:
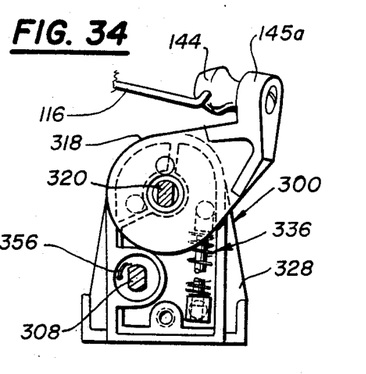
FIG. 34 is a partial, sectional view of the trigger assembly of the reel of FIG. 28 with the bail in the closed position.
Figure 35:
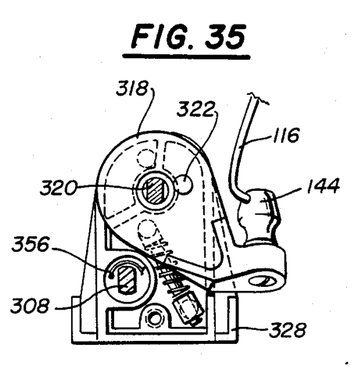
FIG. 35 is a sectional view similar to FIG. 34, but with the bail in the opened position.
Figure 36:
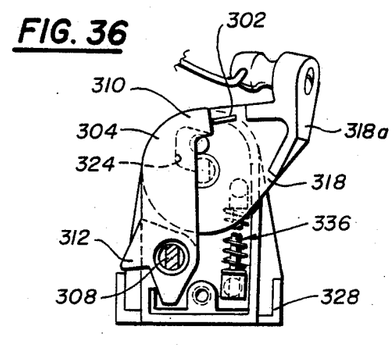
FIG. 36 is another partial, sectional view of the trigger assembly of the reel of FIG. 28 with the bail in the closed position.
Figure 37:
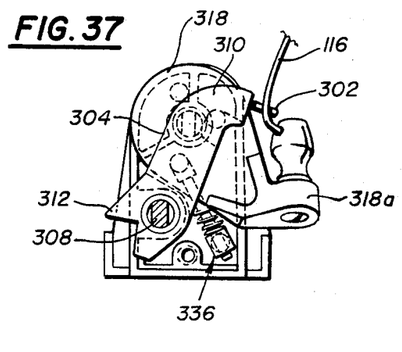
FIG. 37 is a sectional view similar to FIG. 36, but with the bail in the opened position.
Figure 38:
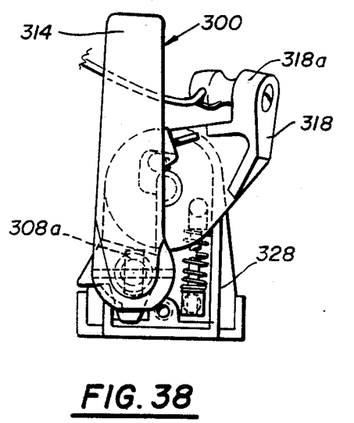
FIG. 38 is a partial, plan view of the fourth embodiment of trigger assembly of the invention with the bail in the closed position.
Figure 39:
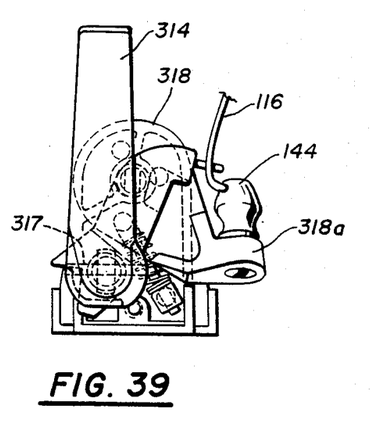
FIG. 39 is a plan view similar to FIG. 38, but with the bail in the opened position.
Figure 40:
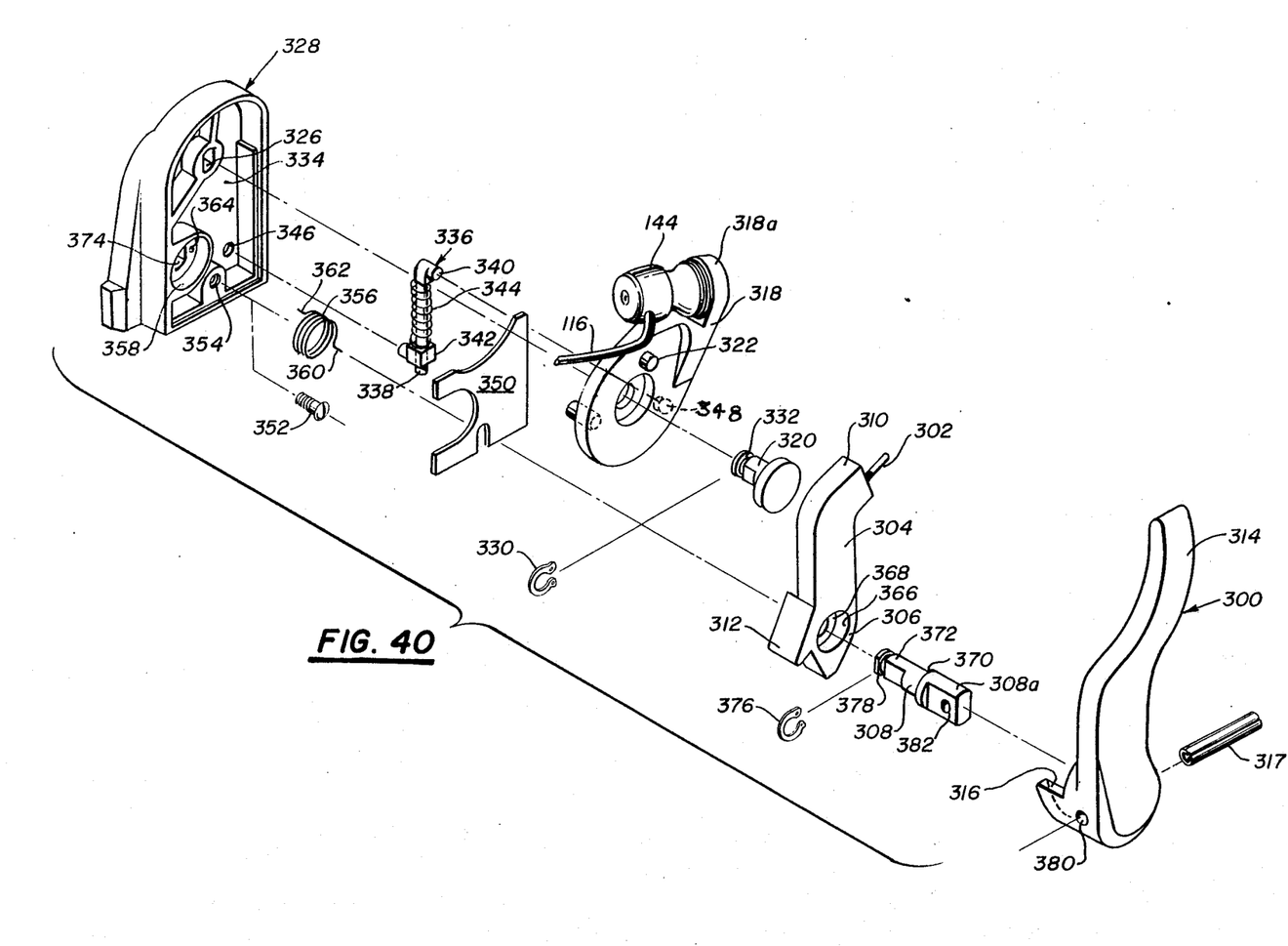
FIG. 40 is an exploded view of the fourth embodiment of the trigger assembly of the invention.

The line control mechanism 8c comprises a trigger assembly 300 having a pin 302 and crank arm 304 which move between a fishing line holding position as shown in FIGS. 37 & 39 and a non-holding position as shown in FIGS. 34, 36 and 38.

The crank arm 304 is pivoted at the end 306 on a trigger holder pin 308 while the free end 310 carries the Pin 302. A butt portion 312 extends laterally from the end 306.

The trigger assembly 300 also includes a pivoted trigger 314 having a lateral cam portion 316 that engages the butt portion 312 of crank arm 304 to cause it to move clockwise, i.e., from the position shown in FIG. 36 to the position shown in FIG. 37, upon upward movement of the trigger 314.

The trigger 314 is pivoted on pin 317 fitted in the end 308a of pin 308 so the longitudinal axis of pin 317 is perpendicular to the longitudinal axis of pin 308. The pin 308 also serves as the pivot for the crank arm 304.

A crank 318 moves about on pivot pin 320 in an arc as shown by comparing FIG. 38 with FIG. 39. The bail 116 and the line guide 144 are mounted to the crank 318 via the drilled offset portion 318a.

The crank 318 includes a projection (pin) 322 that rides in channel 324 in the crank arm 304 to cause the crank 318 to move in a clockwise direction upon similar movement of the arm 304.

As previously stated, the crank 318 is pivoted on the pin 320 that fits into opening 326 in the base portion 328 of the trigger assembly 300. Pin 320 is fixed in its functional position by horseshoe retainer 330 that snaps into the pin slot 332.

Base portion 328 includes a recess 334 in which a toggle spring assembly 336 is captured to swing from one stable position (see FIG. 36) through dead center to another stable position (see FIG. 37).

The spring assembly 336 includes a rod 338 to which a pin member 340 is fixed at one end while a second pin member 342 slides on the other end. The coil spring 344 is compressed between the members 340 & 342. Member 340 fits into the bore 348 in crank 318. With this arrangement, spring assembly 336 biases crank 318 toward the line winding (closed) position (FIG. 36) of the bail 116 in one of its stable positions and toward the line-freeing position (opened) of the bail 116 (FIG. 37) in the other of its stable positions.

A plate 350 is provided to cover the recess 334 and retain the spring assembly 336 therein. A screw 352 threads into bore 354 to hold the plate 350 in place on the base portion 328.

A coil spring 356 serves to bias crank arm 304 ccw toward the line release position of pin 302. The spring 356 fits into recess 358 and its end 360 engages butt 312 of crank arm 304 while the other end 362 engages a hole 364 in the base of recess 358. Thus, spring 356 is compressed when the crank arm 304 is moved cw by action of tab 316 on the butt 312 of crank arm 304 as trigger 314 is cocked.

The crank arm 304 and trigger 314 are held in operating position on the base portion 328 by the pin 308. Thus, the pin 308 fits through the bore 366 in crank arm 304 so bore shoulder 368 engages pin shoulder 370. Pin end 372 extends through slot 374 in base portion 328 and is held therein by horseshoe retainer 376 fitted into slot 378. To complete the connection of trigger 314 into the assembly 300, pin 317 extends through bore 380 in the trigger 314 and bore 382 in the pin 308 permitting trigger 314 to pivot on the pin 317 and crank arm 304 to pivot on pin 308.

Pin 308 has an axis transverse to the longitudinal axis of the reel upon which it is mounted while the pin 317 extending through the bore 382 has an axis perpendicular to the axis of pin 308. Crank arm 304 pivots on a axis perpendicular to the axis of pin 308.

OPERATION

The operation of improved spinning-type fishing reels of the invention permit the user to hold a rod 22 with one hand 70 and to prepare the reel 4 for casting simply by the use of that hand and without need to contact the line 24 with the index finger 72 or any other part of hand 70 nor the other hand (not shown) of the user. Thus, the new line control device 2 of the invention makes it possible for a fisherman using the improved reel 4 to go through a complete casting operation with the rod 22 by simply pulling on the trigger 50 and then again releasing it as a part of a cast.

Such trigger manipulation swings the bail from the closed (line winding) position to the opened (line casting) position and, simultaneously automatically controls the line 24 to prevent in from unreeling from the spool 12 until the trigger 50 is released. At the end of the cast, a brief turning of crank means 20 will move the bail 16 across to the closed position to pick up the line in the guide member 44 in known manner. Hence, the rod is again prepared to hook a fish and reel it in, all this being accomplished without need for the fisherman to contact the line 24 with a finger or other body part.

The series of parts movement in the casting operation as just described can be further understood by reference to the drawings.

Figure 4:
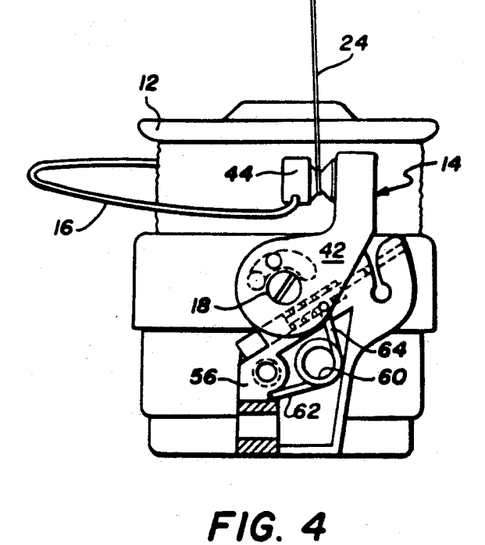
FIG. 4 is a partial, sectional view taken on the line IV—IV of FIG. 1.
Figure 5:
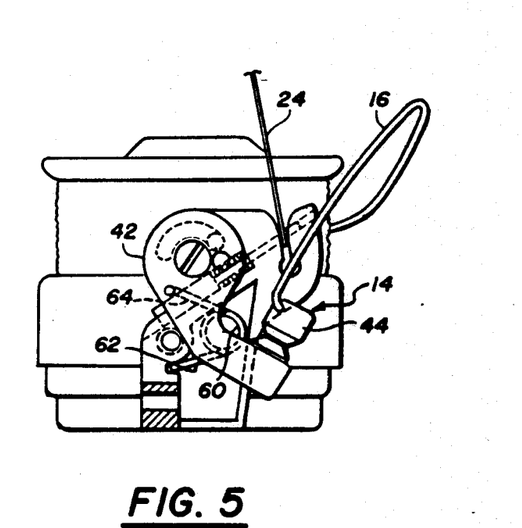
FIG. 5 is a sectional view similar to FIG. 4 showing another position of the line holding means of the invention in use of the reel.

At the conclusion of a retrieval of line 24 with reel 4, the arrangement of parts is as shown in FIG. 4 with line 24 passing from spool 12 over the guide member 44 and out through the rod guides (not shown) of the rod 22. To prepare for casting, the user, while holding the rod 22 in hand 70, pulls up on the trigger 50. This causes lever member 40 to move the bail 16 across the reel 4 from the closed position (FIG. 4) to the opened position (FIG. 5). In the course of this bail movement, the arc of the guide 44 will pass over the entrance 32 of the guideway 30. The dimensioning of the lever member as to pivot point, spacing to the butting end 34a of pin 34, etc. is arranged so that the pin 34 is still retracted from the entrance 32. As the bail moves further toward completion of its swing, the line 24 enters the guideway 30 and, simultaneously, the pin is moved by the lever member 40 across entrance 32, thereby capturing the line 24.

Figure 1:
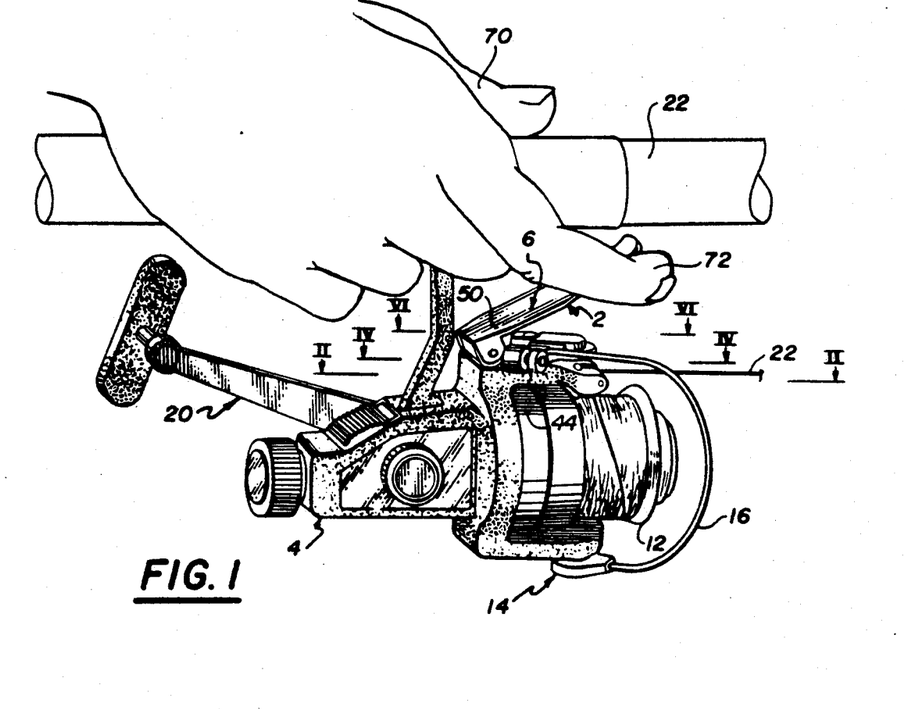
FIG. 1 is a perspective lateral view of a first embodiment of an open-face, spinning-type fishing reel constructed in accordance with the invention.
Figure 6:
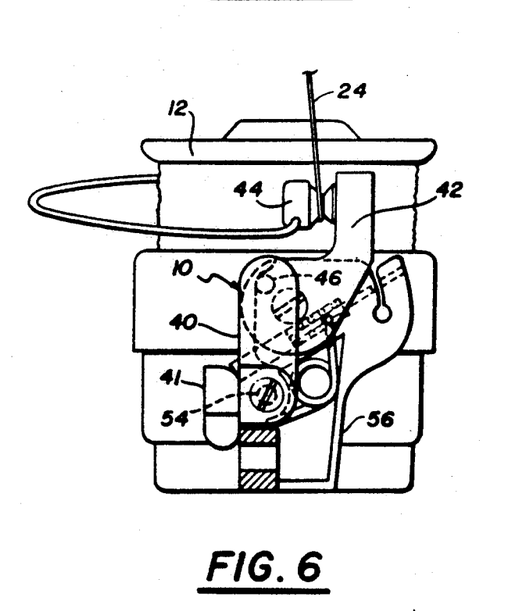
FIG. 6 is a partial, sectional view taken on the line VI—VI of FIG. 1.
Figure 7:
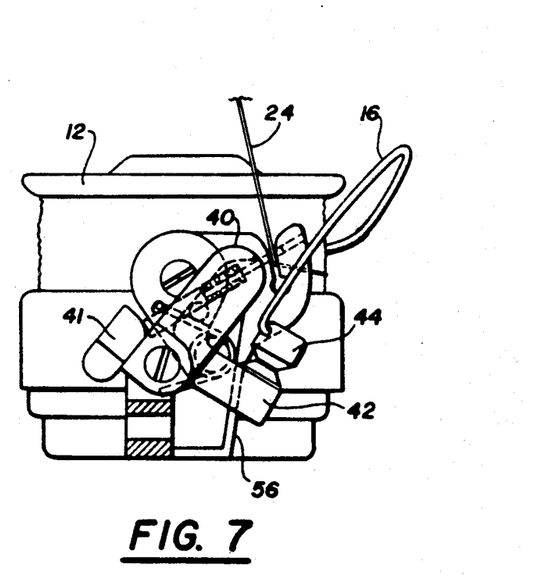
FIG. 7 is a sectional view similar to FIG. 6 showing another position of the line holding means of the invention in use of the reel.
Figure 8:
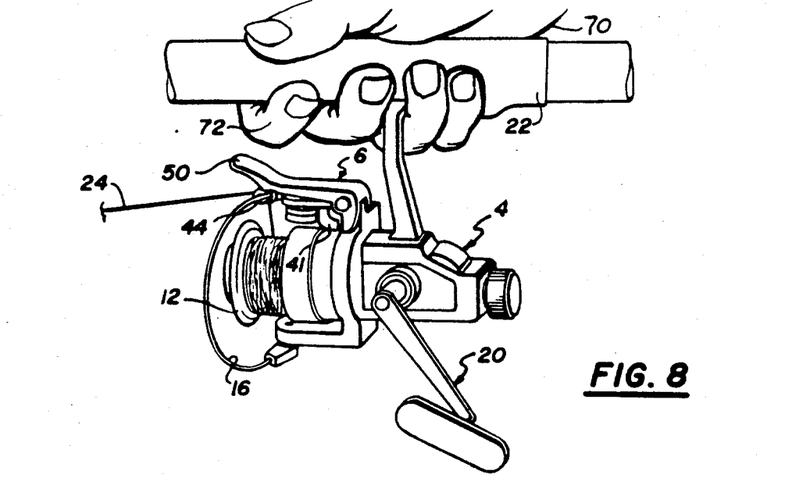
FIG. 8 is a perspective view of the fishing reel of FIG. 1 shown from the reverse side.
Figure 9:
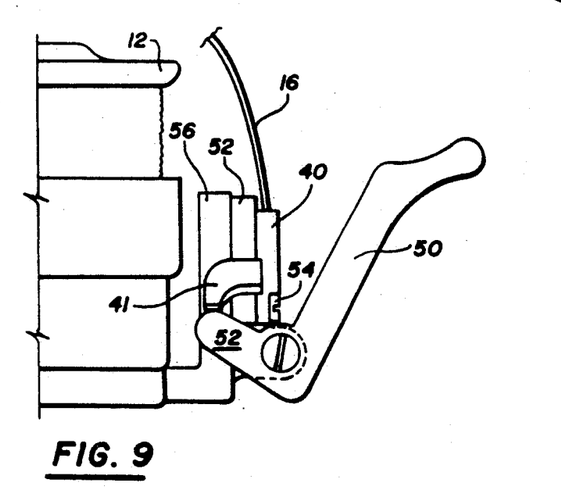
FIG. 9 is a lateral, fragmentary view of the reel of FIG. 1 shown with the reel's trigger cocked and the bail in the opened position.

Until the user is ready to cast, the trigger 50 is held in the upper position (see FIG. 1). This keeps the bail 16 in the open position and the line 24 retained against unreeling from spool 12. When the cast is made with the rod 22, the trigger 50 is released whereupon the pressure from spring 36 forces pin 34 to move out of entrance 32. This spring pressure, via pin end 34a bearing on the lever member 40, returns it to the position shown in FIG. 6. At the same time, the bail 16 remains in the opened position via action of spring 60 and since the spring 36 does not move the bail to the closed position since the pin 46 on the crank 42 is not captured by the lever member 40.

When sufficient line has played off the spool 12, the user takes a turn on the crank means 20 which causes the crank 42 to flip spring 60 over from the position shown in FIG. 5 to the position shown in FIG. 4 and to swing the bail into the closed position during which the bail crosses the line 24 to pick it up and move it onto the guide portion 44 (see FIG. 4). The fisherman is then ready to reel in the line as soon as a fish is hooked. Hence with the improved reels of the invention, the entire line casting and retrieval operation is accomplished without need to handle the fishing line. Thus, the invention provides improved line control on spinning-type fishing reels.

The crank means 20 for shifting the bail 16 from a casting (open) position to a winding (closed) position includes not only a crank (unnumbered), but other elements (not shown), e.g., gears, stops, etc. which are conventional in the art and can be of a variety of forms, e.g., see U.S. No. 4,389,027. The improvements of the invention are intended for use with any of such conventional spincast reel bail movement mechanisms.

The method of use of the second embodiment reel 102 shown in FIGS. 15-21 is essentially the same as for the reel 2, but in the operation of the reel 102, the fishing line 124 line does not enter a guideway in the course of being held by the pin 126.

With reel 104, when the line has been cast and the rod is positioned for catching a fish, the bail 116 and line guide 144 will be in the position shown in FIG. 21 so that the line 124 will run from the spool 112 over the guide 144 out to the hook and tackle. When a fish is hooked or the line 122 is to be retrieved for any other reason, turning the crank 120 will rotate the bail ccw thereby causing the line to be wound onto the spool 112 until the hook and tackle approach the rod tip. During this line retrieval operation, the pin 126 remains, as shown in FIG. 21, withdrawn from any contact with the line 124.

When the reel user is ready to make a cast, the trigger 138 is pulled, which lifts its free end up away from the bail unit 114. This causes the bail to swing to the opened position as shown in FIG. 22 during which time the line 124 is tensioned by the weight of hook and tackle on its end. Hence as the bail swings across from the closed position toward the opened position, the line 124 remains in contact with the guide 144 until just before the bail 116 and guide 144 reach the full open position as shown in FIG. 22, at which time the line slips off the guide 144. However, as the guide 144 moves toward the opened position, the pin 126 is moved by the arm 128 so it follows along. Thus, by the time the guide 144 reaches the cw position (FIG. 18) where the line slips from it, the pin 126 has positioned itself (see FIG. 22) so that it catches the line 24 as shown in FIG. 15. At the same time, the bail 116 overlaps the pin 126 (see FIG. 22) so that the line 122 remains captured by the pin 126.

The fisherman is now ready to make a cast. To do this, he whips the rod and line in an arc in the desired direction while holding the trigger 138 in the pulled (cocked) position. At the proper moment, he frees the line 124 to play off the spool 112 by releasing the trigger 138 which, in turn, allows the arm via the biasing of the spring 168 to swing ccw thereby also moving the pin ccw to free the line for unreeling.

The operation of reels equipped with the third embodiment line handling mechanisms of the invention will be understood by those skilled in the art to be essentially like that described for reel 104.

The reels equipped with the fourth embodiment of line handling mechanisms of the invention are improved as compared with the other three embodiments because the trigger 314 and the crank arm 304 both function on a common retention pin 308. In the operation of such reels, the crank arm 304 and its line retention pin 302 pivots about the pin 308 in a plane perpendicular to the axis of the pin 308. Trigger 314, while mounted to the pin 308 pivots on the axis of pin 317 perpendicular to the axis of pin 308 that lies n a plane parallel to the plane of rotation of the crank arm 304.

As will be apparent from the foregoing description, the entire sequence of steps of casting and reeling line with my improved fishing reels is performed without need for the fisherman to contact the fishing line with a finger.

THE EMBODIMENTS OF THE INVENTION IN WHICH AN EXCLUSIVE PROPERTY OR PRIVILEGE IS CLAIMED ARE DEFINED AS FOLLOWS :

1. In an open-face spinning-type fishing reel having a spool onto which line is wound about the longitudinal axis thereof; a rotatable bail unit including a bail and line guide that swing between a closed, line winding position and a fully opened, line casting position wherein the bail and line guide are out of contact with the line; a trigger assembly which swings said bail from said closed to said opened position when the trigger of said trigger assembly is cocked and means that returns the bail to its closed position at the completion of a cast and rotates the bail unit around said longitudinal axis for winding fishing line around the spool, the improvement comprising:
   line holding means separate from said bail and line guide supported upon said bail unit for rotation therewith
   said line holding means comprising a pin which engages said fishing line as said bail is moved by said trigger assembly toward said opened position,
   retains said fishing line against unreeling while said trigger is cocked, and
   releases said line to permit its unreeling from said spool upon release of said trigger during casting of said fishing line, and
   means linking said line holding means to said trigger assembly to cause said line holding means to perform said line engagement, retention and release.

2. The fishing reel of claim 1 wherein said line holding means includes a crank arm mounted for oscillation on a retention pin, said retention pin having a longitudinal axis normal to the plane of oscillation of said crank arm, with one end thereof fixed to a portion of said trigger assembly leaving the other end thereof free and said trigger being pivoted for reciprocal movement on said free end of said retention pin.

3. The fishing reel of claim 2 having a first pin extending through said free end of said retention pin normal to said longitudinal axis, said first pin being the pivot of said trigger.

4. In an open-face spinning-type fishing reel having a spool onto which line is wound about the longitudinal axis thereof; a rotatable bail unit including a bail and line guide that swing between a closed, line winding position and a fully opened, line casting position wherein the bail and line guide are out of contact with the line a trigger assembly for swinging the bail from said closed to said opened position when the trigger of said assembly is cocked; and crank means that returns the bail to its closed position at the completion of a cast and rotates the bail unit around said longitudinal axis for winding fishing line around the spool, the improvement comprising:
   line holding means mounted on said bail unit for rotation therewith comprising:
   a guideway having an entrance into which said fishing line is moved by said bail, and
   a pin that reciprocates across said guideway entrance to block and unblock said entrance, and
   means linking said line holding means to said trigger assembly to cause said pin to reciprocate.

5. The fishing reel of claim 4 which includes a spring that biases said pin to move to unblock said guideway entrance.

6. The fishing reel of claim 5 wherein said trigger assembly includes a pivoted crank arm that engages said pin to move it across said guideway entrance and a pivot support for said crank arm.

7. The fishing reel of claim 6 wherein said crank arm engages said bail unit to move said bail from said closed position to said opened position.

8. The fishing reel of claim 4 wherein said bail includes a line guide portion that moves in an arc that intersects said guideway entrance.

9. In an open-face spinning-type fishing reel having a spool onto which line is wound about the longitudinal axis thereof; a rotatable bail unit including a bail and line guide that swing between a closed, line winding position and a fully opened, line casting position wherein the bail and line guide are out of contact with the line; a trigger assembly for swinging the bail from said closed to said opened position when the trigger of said assembly is cocked; and crank means that returns the bail to its closed position at the completion of a cast and rotates the bail unit around said longitudinal axis for winding fishing line around the spool, the improvement comprising:

a line holding means mounted on said bail unit for rotation therewith,
said holding means comprising:
  a guideway having an entrance into which said fishing line is moved by said bail, and
  a pin that reciprocates across said guideway entrance to block and unblock said entrance,
said trigger assembly comprises a pivoted crank arm that engages said pin to move it across said guideway entrance,
said crank arm engages said bail unit to move said bail from said closed position to said opened position,
said bail includes a line guide portion that moves in an arc that intersects said guideway entrance,
said trigger has a lateral cam portion that engages said crank arm to cause said crank arm to move upon movement of said trigger and
said crank includes a projection that rides in a recess in said crank arm to cause said crank to move in one direction only upon movement of said crank arm.

10. An open-face, spinning-type fishing reel which comprises:
  a reciprocating spool,
  a rotatable bail unit including a bail that swings about a pivot between an opened position and a closed position,
  a trigger assembly for swinging said bail from said closed position to said opened position, crank means that reciprocates said spool along the longitudinal axis of the reel, rotates said bail unit around said longitudinal axis for winding said fishing line around the spool and returns said bail to its closed position at the completion of a cast, and
  line holding means mounted on said bail unit for rotation therewith which comprises:
    a guideway having an entrance into which said fishing line is moved by said bail, and
    a pin that oscillates to block and unblock unwinding of line from said spool,
  said trigger assembly comprises a pivoted crank arm that oscillates said pin to block and unblock said entrance, which crank arm engages said bail unit to move said bail from said closed position to said opened position,
  said bail includes a line guide portion that moves in an arc with said bail,
  said trigger has a lateral cam portion that engages said crank arm to cause said crank arm to move upon movement of said trigger and
  said trigger assembly includes a crank having a projection that rides in a recess in said crank arm to cause said crank to move in one direction only upon movement of said crank arm.

11. An open-face, spinning-type fishing reel which comprises:
  a reciprocating spool,
  a rotatable bail unit including a bail that swings about a pivot between, an opened position and a closed position, said bail unit including a line guide portion that moves in an arc with said bail, crank means that reciprocates said spool along the longitudinal axis of the reel, rotates said bail unit around said longitudinal axis for winding said fishing line around the spool and returns said bail to its closed position at the completion of a cast, and
  a trigger assembly for swinging said bail from said closed position to said opened position, said trigger assembly comprising:
    a base portion mounted on said bail unit for rotation therewith,
    a retention pin that extends laterally from said base portion leaving a free end thereon,
    a crank arm that engages said bail unit to move the bail from said closed position to said opened position,
    said crank arm being pivoted at one end on said retention pin and carrying on the other end a first pin that oscillates therewith to block and unblock unwinding of fishing line from said spool and
    a trigger that oscillates said crank arm, said trigger being pivoted on a second pin that is carried in said free end of said retention pin.

12. Said fishing reel of claim 11 wherein said trigger has a lateral cam portion that engages said crank arm to cause said crank arm to move upon movement of said trigger.

13. Said fishing reel of claim 12 wherein said trigger assembly includes a crank having a projection that rides in a recess in said crank arm to cause said crank to move in one direction only upon movement of said crank arm.

14. An open-face, spinning-type fishing reel which comprises:
  a reciprocating spool,
  a rotatable bail unit including a bail that swings about a pivot between an opened position and a closed position, said bail unit including a line guide portion that moves in an arc with said bail,
  crank means that
    reciprocates said spool along the longitudinal axis of the reel,
    rotates said bail unit around said longitudinal axis for winding said fishing line around the spool and
    returns said bail to its closed position at the completion of a cast, and
  a trigger assembly for swinging said bail from said closed position to said opened position, said trigger assembly comprising:
    a base portion mounted on said bail unit for rotation therewith,
    a retention pin that extends laterally from said base portion leaving a free end thereon,
    a crank arm that engages said bail unit to move the bail from said closed position to said opened position,
    said crank arm being pivoted at one end on said retention pin and carrying on the other end a first pin that oscillates therewith to block and unblock unwinding of fishing line from said spool and
    a trigger that oscillates said crank arm, said trigger being pivoted on a second pin that is carried in said free end of said retention pin,
    said first pin engaging said fishing line as said bail is moved by said trigger assembly toward said opened position, retaining said fishing line against unreeling while said trigger is cocked, and releasing said line to permit its unreeling from said spool upon release of said trigger during casting of said fishing line.

15. Said fishing reel of claim 14 wherein said trigger has a lateral cam portion that engages said crank arm to cause said crank arm to move upon movement of said trigger.

16. Said fishing reel of claim 15 wherein said trigger assembly includes a crank having a projection that rides in a recess in said crank arm to cause said crank to move in one direction only upon movement of said crank arm.

17. In an open-face spinning-type fishing reel having a spool onto which line is wound about the longitudinal axis thereof; a rotatable bail unit including a bail and line guide that swing between a closed, line winding position and a fully opened, line casting position wherein the bail and line guide are out of contact with the line; a trigger assembly which swings said bail from said closed to said opened position when the trigger of said trigger assembly is cocked and means that returns the bail to its closed position at the completion of a cast and rotates the bail unit around said longitudinal axis for winding fishing line around the spool, the improvement comprising:

line holding means separate from said bail and line guide supported upon said bail unit for rotation therewith     said line holding means comprising an oscillatory crank arm secured on said trigger assembly and     a pin carried on said crank arm which         engages said fishing line as said bail is moved by said trigger assembly toward said opened position,         retains said fishing line against unreeling while said trigger is cocked, and         releases said line to permit its unreeling from said spool upon release of said trigger during casting of said fishing line, and     means linking said crank arm to said trigger to oscillate said crank arm upon cocking of said trigger thereby to cause said pin to perform said line engagement.

18. The fishing reel of claim 17 wherein said crank arm is mounted for oscillation on a first retention pin, said first retention pin having a longitudinal axis normal to the plane of oscillation of said crank arm, with one end thereof fixed to a portion of said trigger assembly leaving the other end thereof free and said trigger being pivoted for reciprocal movement on a second retention pin having a longitudinal axis parallel to the plane of oscillation of said crank arm.

* * * * *